(12) United States Patent
Wend et al.

(10) Patent No.: US 8,607,963 B2
(45) Date of Patent: Dec. 17, 2013

(54) CONVEYOR INSTALLATION COMPRISING CARRIER BAGS FOR MATERIAL TO BE TRANSPORTED

(75) Inventors: Michael Wend, Bielefeld (DE); Paul Janzen, Bielefeld (DE)

(73) Assignee: Duerkopp Foerdertechnik GmbH, Bielefield (DE)

( * ) Notice: Subject to any disclaimer, the term of this patent is extended or adjusted under 35 U.S.C. 154(b) by 342 days.

(21) Appl. No.: 13/177,159

(22) Filed: Jul. 6, 2011

(65) Prior Publication Data
US 2012/0037272 A1 Feb. 16, 2012

(30) Foreign Application Priority Data
Aug. 10, 2010 (DE) .......................... 10 2010 033 905

(51) Int. Cl.
*B65G 17/20* (2006.01)
*B65G 47/06* (2006.01)

(52) U.S. Cl.
USPC ... 198/430; 198/384; 198/397.01; 198/474.1; 141/250

(58) Field of Classification Search
None
See application file for complete search history.

(56) References Cited

U.S. PATENT DOCUMENTS

| 4,674,266 | A | * | 6/1987 | Araki ........................... 53/374.8 |
| 4,974,266 | A | * | 12/1990 | Vultaggio et al. ................. 4/506 |
| 5,232,078 | A | * | 8/1993 | Kuhlmann et al. ........... 198/360 |
| 5,664,659 | A | * | 9/1997 | Gaertner ....................... 198/360 |

FOREIGN PATENT DOCUMENTS

| DE | 3206829 A1 | 9/1983 |
| DE | 102004018569 A1 | 11/2005 |
| DE | 102008026720 A1 | 12/2009 |
| DE | 102008061685 A1 | 6/2010 |
| EP | 0 517 677 A2 | 12/1992 |
| EP | 1690811 A1 | 8/2006 |

OTHER PUBLICATIONS

Co-pending U.S. Appl. No. 13/034,273.

* cited by examiner

*Primary Examiner* — Kavel Singh
(74) *Attorney, Agent, or Firm* — Browdy and Neimark, PLLC

(57) ABSTRACT

A conveyor installation comprises carrier bags for material to be transported, wherein the carrier bags are suspended from carrier dogs which are moved in a transport rail in a transport direction. At a loading and unloading station, the carrier bags are rotatable from their transport position, which is transverse to the transport direction, into a position which points in the transport direction, wherein an upper loading opening is opened at the same time. Backwards rotation of the carrier bags is caused by the force of gravity.

14 Claims, 3 Drawing Sheets

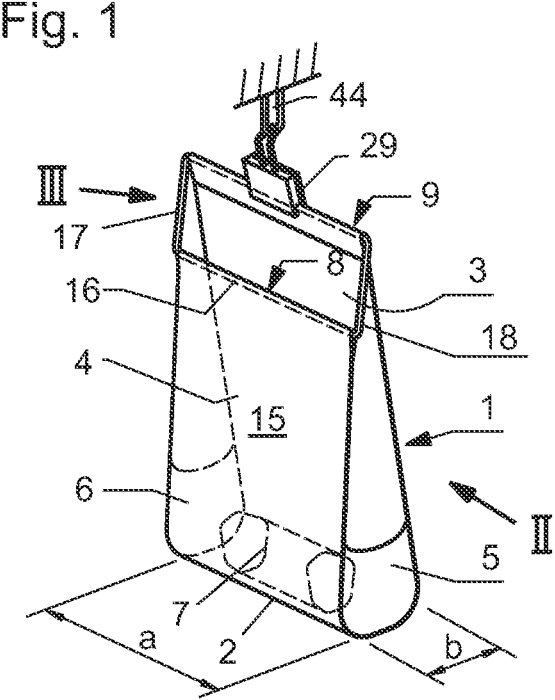
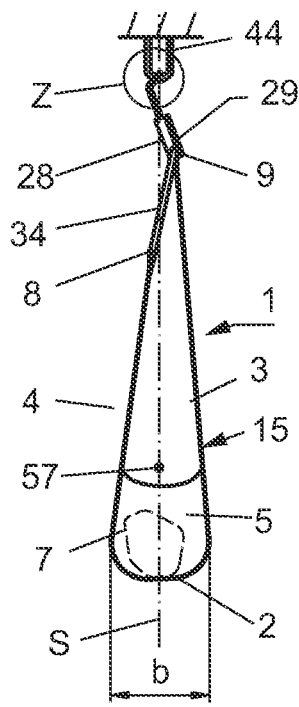
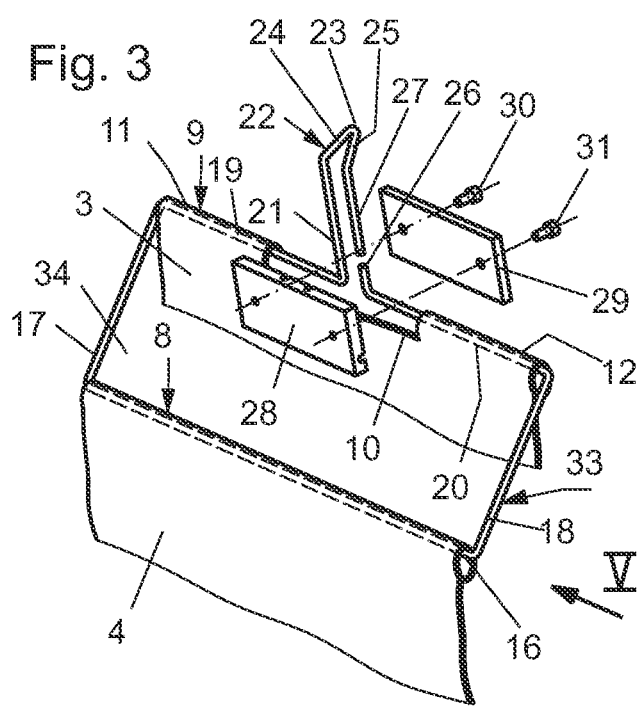
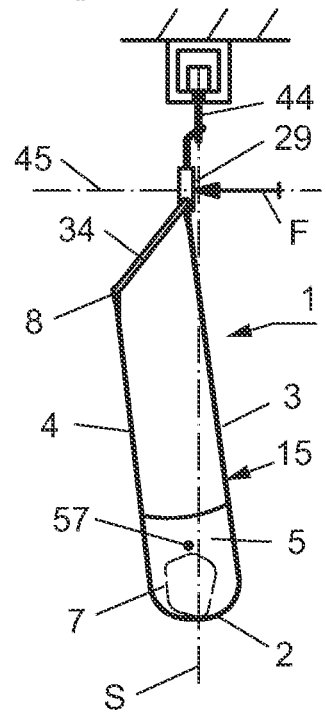
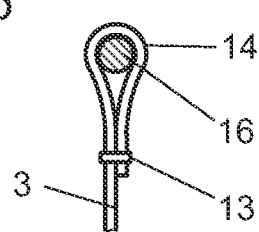

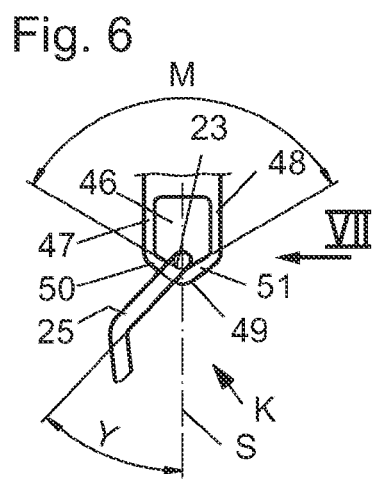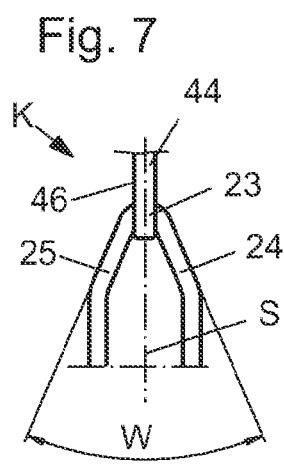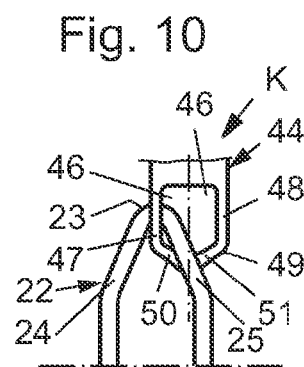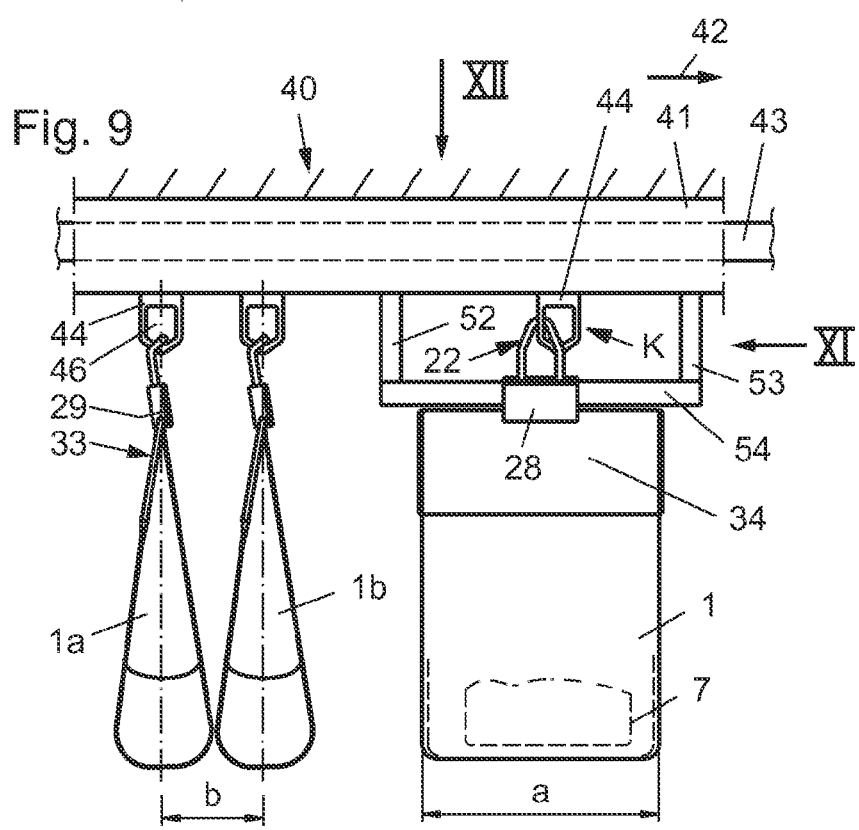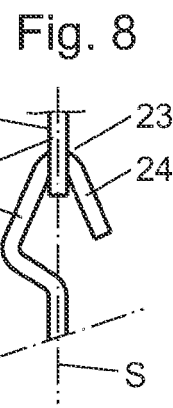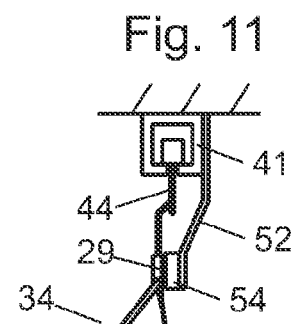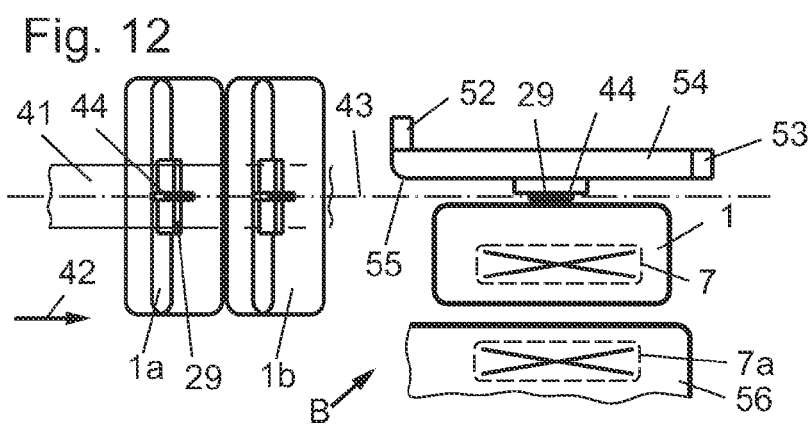

CONVEYOR INSTALLATION COMPRISING CARRIER BAGS FOR MATERIAL TO BE TRANSPORTED

CROSS-REFERENCE TO RELATED APPLICATIONS

This application claims the priority of German Patent Application, Serial No. DE 10 2010 033 905.9 filed on Aug. 10, 2010, pursuant to 35 U.S.C. 119(a)-(d), the content of which is incorporated herein by reference in its entirety as if fully set forth herein.

FIELD OF THE INVENTION

The invention relates to a conveyor installation comprising carrier bags for material to be transported.

BACKGROUND OF THE INVENTION

Background Art

A conveyor installation is known from DE 10 2008 026 720 A1 where the carrier bags are inserted into carrier dogs of a conveyor installation by means of carrier hooks. The carrier bags have a rear wall and a front wall comprising a bottom which is attached to the rear wall by means of a releasable coupling. The upper edges of the rear wall and of the front wall are connected by a rectangular support frame which comprises laterally protruding projections. These projections move on a rail of a loading station in such a way that the support frame is pivoted upwards which causes a loading opening to open. For unloading, the lower coupling is opened, thus allowing a transported material to fall down and out of the carrier bags. The carrier bags are arranged close to each other in the conveyor installation in such a way that the larger width thereof is arranged transversely to the transport direction. The carrier bags are loaded from the side between the front wall and the rear wall.

DE 10 2004 018 569 A1 discloses a conveyor installation comprising carrier bags. The carrier bags consist of a rear wall, a front wall and a bottom. The upper edges are connected with each other by means of a rectangular support frame. In order to open a loading opening which is defined by the support frame, the support frame is provided with projections which are guided across a rail at a loading station, the rail moving the support frame to an approximately horizontal position in such a way that the loading opening is opened. In this conveyor installation, the carrier bags also remain in their position in which the larger width is transverse to the transport direction at all times.

DE 32 06 829 A1 discloses a conveyor installation for transporting a laundry bag which comprises an upper, approximately square support frame to which a sack is attached which is closable at its lower end. The support frame, which is always in a horizontal open position and encloses a loading opening, is manually rotatable about a vertical axis into a position which is optimal for loading.

SUMMARY OF THE INVENTION

It is an aspect of the invention to provide a conveyor installation comprising carrier bags for material to be transported which allows the carrier bags to be arranged in a space-saving manner at a smallest possible distance from each other during transport while ensuring free access to a carrier bag when being loaded and unloaded with material to be transported.

This aspect is achieved by a conveyor installation comprising carrier bags for material to be transported, in particular pieces of clothing, the conveyor installation comprising a stationary transport rail comprising carrier dogs for receiving in each case one carrier bag, the carrier dogs being movable in a transport direction, wherein each carrier bag comprises in each case one sack for receiving material to be transported; wherein each sack comprises a bottom, a front wall having a width a and a rear wall having a width a and side walls having a width b which is narrow relative to the width a of the front wall and of the rear wall; wherein each sack comprises a support frame which encloses an upper loading opening of the sack; comprises a suspension point at an upper end, the suspension point being adapted to be inserted into a carrier dog; and comprises a pressure piece which is parallel to the front wall and to the rear wall; a loading station which comprises a sliding surface which is arranged below and parallel to the transport rail; and a coupling formed between a carrier dog and the support frame carried by the carrier dog, which coupling in a position in which the pressure piece is disengaged from the sliding surface, takes up a first rotational position of the carrier bag relative to the carrier dog in which rotational position the loading opening of the carrier bag takes up a position which is transverse to the transport direction; and when the pressure piece is in contact with the sliding surface, takes up a second rotational position of the carrier bag relative to the carrier dog in which rotational position the loading opening of the carrier bag is parallel to the transport direction.

A space-saving positioning of the carrier bags used to receive material to be transported ensures a largest possible loading capacity of the conveyor installation according to the invention. On the other hand, loading and unloading the carrier bags with material to be transported is very easily possible. Rotating the bags from a transport position to a loading and unloading position is very simple, with the loading opening, which is closed during transport, being opened at the same time.

Further features, advantages and details of the invention will become apparent from the ensuing description of an embodiment by means of the drawing.

BRIEF DESCRIPTION OF THE DRAWING

FIG. 1 is a perspective view of a carrier bag of the conveyor installation in which the loading opening is closed;

FIG. 2 is a side view of the carrier bag, seen in the direction of arrow II in FIG. 1;

FIG. 3 is an enlarged perspective view according to FIG. 1 of the upper part of the carrier bag with an open loading window, seen in the direction of arrow III in FIG. 1;

FIG. 4 is a side view corresponding to FIG. 2 of the carrier bag with an open loading opening;

FIG. 5 is a perspective view according to arrow V in FIG. 3;

FIG. 6 is an enlarged view according to FIG. 2 of a suspension of the carrier bags according to detail Z in FIG. 2;

FIG. 7 is a view of the region shown in FIG. 6 in the direction of arrow VII in FIG. 6;

FIG. 8 is a modified view corresponding to FIG. 7;

FIG. 9 is a front view of a conveyor installation with the carrier bags being inserted;

FIG. 10 is a view of the suspension of the carrier bags which corresponds to FIG. 6 but is rotated through 90°;

FIG. 11 is a side view of the conveyor installation according to arrow XI in FIG. 9;

FIG. 12 is a plan view of the conveyor installation according to arrow XII in FIG. 9;

DESCRIPTION OF THE PREFERRED EMBODIMENT

Figure 13:
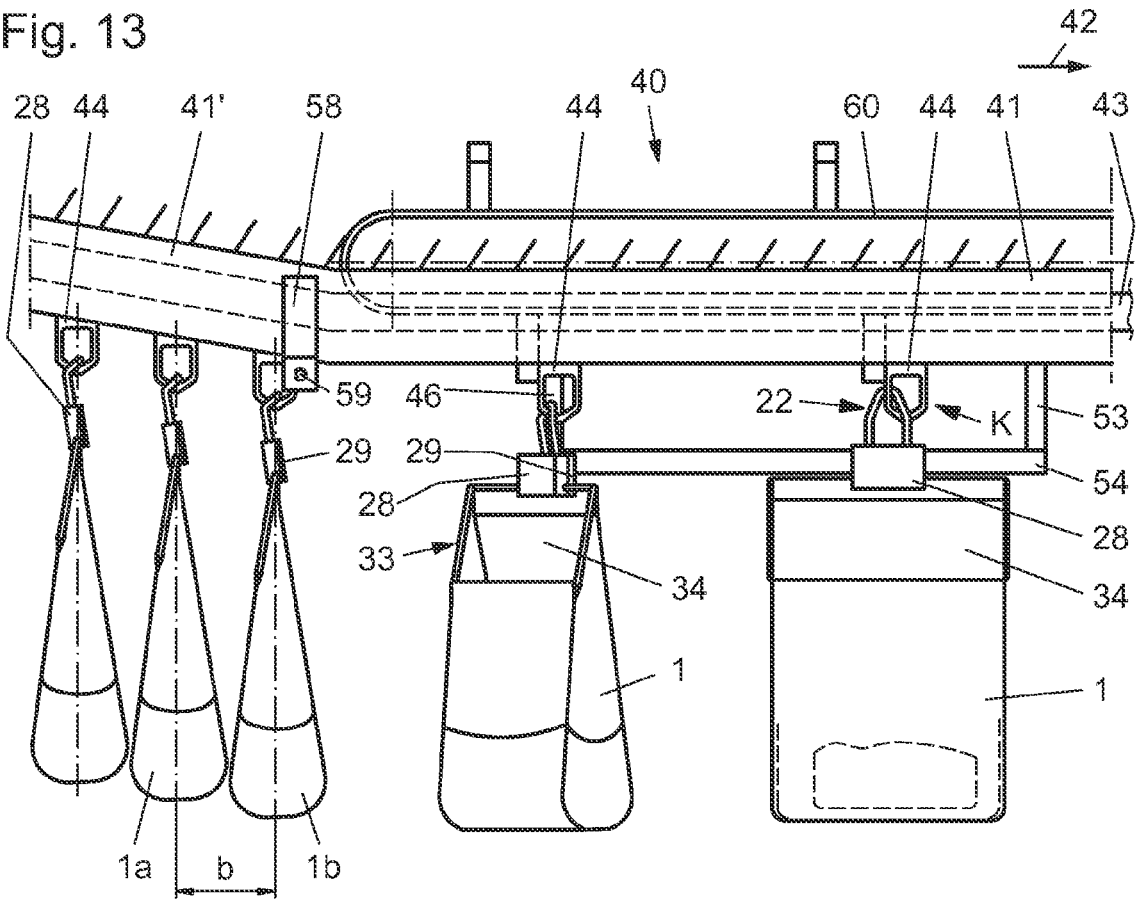
FIG. 13 is a side view of the conveyor installation which is slightly modified compared to FIG. 11.

A carrier bag 1 comprises a bottom 2 having a semi-circular cross-section and walls extending upwards from the bottom 2, namely a rear wall 3 and a front wall 4. The rear wall 3 extends beyond the upper boundary of the front wall 4. In the region of the bottom 2, the rear wall 3 and the front wall 4 are in each case connected by means of a side wall 5 or 6, respectively. The rear wall 3 and the front wall 4 have a width a. The side walls 5 or 6, respectively, have a width b. The walls 3, 4, 5, 6 are arranged relative to each other in such a way as to form a rectangular cross-section. The bottom 2 and the walls 3 to 6 form a bag which is upwardly open and is adapted to receive a material 7 to be transported such as a piece of clothing. The front wall 4 comprises an upper edge 8 which is formed by a hem 14. The rear wall 3 comprises an upper edge 9 which is formed by hems 11, 12 and which is interrupted by a central cutout 10. The hems 11, 12, 14 are in each case fixed by a seam 13 as shown by FIG. 5 for hem 14. The sack 15 formed by the bottom 2, the rear wall 3, the front wall 4 and the side walls 5, 6 consists of a flexible material such as a fabric or a plastic film.

The upper end of the sack 15 is provided with a support frame 33 which defines a loading opening 34. This support frame 33 is made of a round bar of steel consisting of one piece. As in particular shown by FIG. 3, this bar is bent in such a way as to form a substantially rectangular frame. The bar comprises a crossbar 16 which is arranged in the hem 14 of the front wall 4 while the ends of the crossbar 16 are bent backwards such as to form two connection bars 17, 18 which are arranged at right angles to the crossbar 16 and lead to the rear wall 3 as well as two crossbars 19, 20 which are located in the hem 9 and lead to the cutout 10. The crossbars 19, 20 are parallel to the crossbar 16. The connection bars 17, 18 are also parallel to each other.

A bar portion 21 of the crossbar 19 is bent upwards. The upper region of the bar portion 21 is provided with an angled portion 22 which forms an angle Y with a vertical line of gravity S, with 25°≤Y≤65°, preferably Y=45°, as shown in particular by FIG. 6. This angled portion 22 is formed by two legs 24, 25 which have the shape of an upside down V as shown by FIG. 7. The legs 24, 25 form an angle W, with 30°≤W≤120° and preferably W=40°. The tip of the two legs 24, 25 forms a suspension point 23. A bar portion 27, which is parallel to the bar portion 21, projects downwards from the leg 25. A portion of the crossbar 20 is bent upwards so as to form a short bar portion 26 which is flush with the bar portion 27. Between the two bar portions 26, 27, there is a small open gap as shown by FIG. 3.

The adjacent regions of the crossbars 19, 20 and of the bar portions 26, 27 and 21 are received in adapted recesses (only schematically shown in FIG. 3) of a block 28 which consists of plastics where they are clamped by means of a plate-shaped pressure piece 29 which is secured to the block 28 by means of screws 30, 31 in the form of countersunk screws. The crossbar 16, the connection bars 17, 18, the crossbars 19, 20 and the adjacent parts of the bar portions 21, 26, 27 and the block 28 comprising the pressure piece 29 form the already mentioned support frame 33 which defines the loading opening 34. The bar portion 21 and the angled portion 22 form a tie bar. The sack 15 and the support frame 33 together form the carrier bag 1.

A conveyor installation 40 for transporting the carrier bags 1 comprises a stationary transport rail 41 with a traction cord 43 for moving carrier dogs 44 guided for displacement in the transport rail 41. The traction cord 43 is driven by a motor which is not shown. The carrier dogs 44 are displaceable in the transport rail 41 in the transport direction 42 but are not movable horizontally and transversely to the transport direction 42, in other words in the direction of the line of action 45 shown in FIG. 4, which means they are not able to change their position shown in FIG. 4. Furthermore, the carrier dogs 44 are not rotatable about a vertical axis.

Each of the carrier dogs 44 has a recess 46 in the form of a window which extends in the transport direction 42 and is open in a direction transverse to the transport direction 42, the recess 46 being bounded by two vertical legs 47, 48 and a V-shaped web 49 which connects the legs 47, 48 in the downward direction, the web legs 50, 51 of the web 49 forming an angle M, with 45°≤M≤140° and preferably M=100°.

According to FIG. 7, the carrier bag 1 in the described embodiment needs to be secured to the carrier dog 44 before the block 28 is screwed to the pressure piece 29 as the bar portion 27 needs to be inserted through the recess 46 in order for the suspension point 23 to be suspended from the V-shaped piece 49. If, however, the leg 25 is not adjoined by a bar portion 27 as for example shown by FIG. 8, then it is possible for the leg 25 to be inserted into the recess 46. The suspension point 23 attached to the bar portion 21 is bounded by the legs 24, 25. The angled portion 22 on the one hand and the web legs 50, 51 defining the recess 46 on the other form a coupling K between the support frame 33 and the carrier dog 44 as shown by FIGS. 6, 7, 8 and 10.

Above a loading station B, a sliding surface 54 is provided below and parallel to the transport rail 41. To this end, the sliding surface 54 is mounted to the transport rail 41 by means of two retaining bars 52, 53. At an end opposite to the transport direction 42, the sliding surface 54 is provided with a rounded run-up portion 55 as shown by FIG. 12. The sliding surface 54 is arranged in such a way that it is on a level with the pressure piece 29 of the carrier bag 1, allowing the pressure piece 29 of the carrier bag 1 to move on the sliding surface 54 so as to be deflected by the sliding surface 54.

The functioning of the conveyor installation 40 is as follows:

When the conveyor installation 40 is operated, for example empty carrier bags 1a, 1b are transported in the transport direction 42 as shown by FIG. 9. In this process, the carrier bags 1a, 1b are transported closely next to each other at the distance of their width b, in other words they are suspended in such a way that their larger width a is transverse to the transport direction 42. The suspension point 23 is at its lowest position in the web 49 of the carrier dog 44. This space-saving arrangement ensures an optimum utilization of the conveyor installation 40 due to a largest possible loading capacity of material 7 to be transported.

The carrier bags 1 reach the loading station B which comprises a stationary table 56 on which material 7 to be transported is stored. When the pressure piece 29 of a carrier bag 1 moves on the sliding surface 54, this pressure piece 29 is rotated through 90° such that the larger width a of the carrier bag is moved to a position which is parallel to the sliding surface 54 and therefore to the transport direction 42 as shown by FIGS. 9 and 12. When the pressure piece 29 is rotated through 90° about a substantially vertical axis, the suspension point 23 is rotated through 90° as well. The leg 25 of the angled portion 22 slides along the web leg 51 of the V-shaped web 47, causing the suspension point 23 to be supported against the web leg 50 at first and then against the leg 47. The inclination of the legs 24, 25 and of the web legs 50, 51 acts in the manner of a screw, causing the leg 25 to slide up along the carrier dog 44 which is non-rotatably guided in the transport rail 41, with the result that the entire carrier bag 1 is lifted up.

The sliding surface 54 is offset relative to the normal suspension position of the carrier bag 1 in the direction of the line of action 45 in such a way that when the pressure piece 29 moves on the sliding surface 54 which causes the pressure piece 29 and the carrier bag 1 to be rotated, the pressure piece 29 is acted upon by a force F on the support frame 33 in the direction of the loading opening 34 of the carrier bag 1 as shown for example by FIGS. 4 and 11. This causes the support frame 33 to be pivoted in such a way that the loading opening 34 is opened. In other words, it is pivoted upwards from its substantially closed position according to FIGS. 1, 2 and 9 to an open position. The center of gravity 57 of the carrier bag 1 is thus pivoted away from the line of gravity S which passes through the suspension point 23.

At the loading station B, an empty carrier bag 1a or 1b may be loaded with a material 7a to be transported or a transported material 7a may be removed therefrom. When a loaded or unloaded carrier bag 1 is moved on for further transport, the pressure piece 29 thereof is disengaged from the sliding surface 54. This causes the loading opening 34 to close again as the center of gravity 57 of the carrier bag 1 moves back to the vertical line of gravity S which passes through the suspension point 23. Also, the force of gravity causes the suspension point 23 to move back down from its instable, lifted position in the carrier dog 44 until it has reached the lowest point of the suspension point 23 in the V-shaped web 49 of the carrier dog. In this process, a pivoting movement takes place which is opposite to the pivoting movement described above, i.e. through 90° back to a position in which the carrier bag 1 is transverse to the transport direction 42. In other words, the pivoting movement of the carrier bag 1 from the loading position to the transport position occurs automatically and is the result of the force of gravity.

Figure 14:
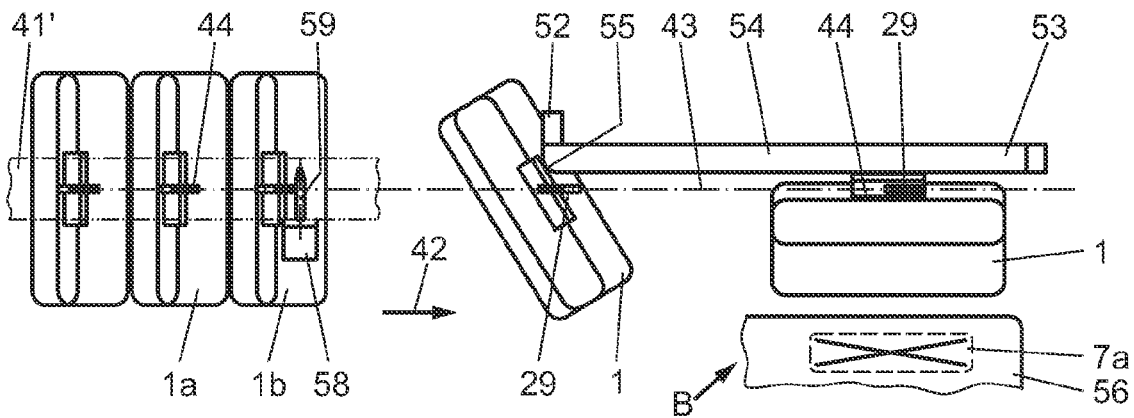
FIG. 14 is a plan view of the conveyor installation according to arrow XIV in FIG. 13.

The embodiment according to FIGS. 13 and 14 differs from the embodiment according to FIGS. 9 and 12 in the way how carrier bags 1 suspended from carrier dogs 44 are separated in front of a loading station B. The transport rail has a transport rail portion 41' which is inclined relative to the transport direction 42 in front of the loading station B so that the carrier dogs 44 with the carrier bags 1 move down to the loading station B as a result of gravity. In front of the loading station B, they are stopped by means of a stopping device 58 which comprises a stopping pin 59 which is removable from the path of the respective carrier dog 44 by means of an electromagnet. Each time the stopping pin 59 is pulled back and away from the transport rail 41' which clears the path for a carrier dog 44 with a carrier bag 1, the carrier dog 44 enters the horizontal transport rail 41 where it is picked up by the traction cord 43 of the endlessly circulating transport chain 60 so as to be transported through the loading station B at an adapted speed. FIGS. 13 and 14 also show the moment in which the pressure piece 29 of a carrier bag 1 moves on the sliding surface 54 which causes the carrier bag 1 to be lifted up and rotated through 90°.

What is claimed is:

1. A conveyor installation comprising carrier bags (1, 1a, 1b) for material (7, 7a) to be transported, the conveyor installation comprising a stationary transport rail (41) comprising carrier dogs (44) for receiving in each case one carrier bag (1, 1a, 1b), the carrier dogs (44) being movable in a transport direction (42),
  wherein each carrier bag (1, 1a, 1b) comprises in each case one sack (15) for receiving material (7, 7a) to be transported;
  wherein each sack (15) comprises a bottom (2), a front wall (4) having a width a and a rear wall (3) having a width a and side walls (5, 6) having a width b which is narrow relative to the width a of the front wall (4) and of the rear wall (3);
  wherein each sack (15) comprises a support frame (33) which
    encloses an upper loading opening (34) of the sack (15);
    comprises a suspension point (23) at an upper end, the suspension point (23) being adapted to be inserted into a carrier dog (44); and
    comprises a pressure piece (29) which is parallel to the front wall (4) and to the rear wall (3);
a loading station (B) which comprises a sliding surface (54) which is arranged below and parallel to the transport rail (41); and
a coupling (K) formed between a carrier dog (44) and the support frame (33) carried by the carrier dog (44), which coupling (K)
  in a position in which the pressure piece (29) is disengaged from the sliding surface (54), takes up a first rotational position of the carrier bag (1, 1a, 1b) relative to the carrier dog (44) in which rotational position the loading opening (34) of the carrier bag (1, 1a, 1b) takes up a position which is transverse to the transport direction (42); and
  when the pressure piece (29) is in contact with the sliding surface (54), takes up a second rotational position of the carrier bag (1, 1a, 1b) relative to the carrier dog (44) in which rotational position the loading opening (34) of the carrier bag (1, 1a, 1b) is parallel to the transport direction (42).

2. A conveyor installation according to claim 1, wherein the coupling (K) is designed in such a way as to act in the manner of a screw, wherein the carrier bag (1) is lifted up after a rotation from the first rotational position to the second rotational position.

3. A conveyor installation according to claim 1, wherein each carrier dog (44) comprises a recess (46) which, in a vertical plane extending in the transport direction (42), is downwardly bounded by a V-shaped web (49) comprising web legs (50, 51), wherein the web legs (50, 51) form an angle M between each other;
the suspension point (23) of the support frame (33) is formed at a tip of two legs (24, 25) of the support frame (33) which are in the shape of an upside down V while forming an angle W between each other, wherein the legs (24, 25) are parallel to each other when passing through the suspension point (23) in the first rotational position and extend in a plane which is inclined through an angle (Y) relative to a line of gravity S; and
the legs (24, 25) and the web (49) are in engagement with each other.

4. A conveyor installation according to claim 1, wherein the rear wall (3) extends beyond the upper boundary of the front wall (4);
a first crossbar (16) of the support frame (33) is mounted to an upper edge of the front wall (4) and at least one second crossbar (19, 20) of the support frame (33) is mounted to an upper edge of the rear wall (3); and in the first rotational position of the coupling (K), the first crossbar (16) is below the at least one second crossbar (19, 20).

5. A conveyor installation according to claim 4, wherein the pressure piece (29) is rigidly connected to the at least one crossbar (19, 20) which carries the rear wall (3), wherein in the second rotational position, the first crossbar (16) is pivoted upwards relative to a lower position in the first rotational position.

6. A conveyor installation according to claim 1, wherein the support frame (33) is formed in one piece with the suspension point (23) from a round bar.

7. A conveyor installation according to claim 1, wherein the edges (8, 9) of the front wall (4) and of the rear wall (3) are hems (14, 11, 12) which receive the first and second crossbars (16, 19, 20).

8. A conveyor installation according to claim 1, wherein the front wall (4), the bottom (2) and the rear wall (3) are formed in one piece of one of fabric and plastic film.

9. A conveyor installation according to claim 1, wherein to the angle M applies $45°≤M≤140°$.

10. A conveyor installation according to claim 9, wherein to the angle M applies $M=100°$.

11. A conveyor installation according to claim 1, wherein to the angle Y applies $25°≤Y≤65°$.

12. A conveyor installation according to claim 11, wherein to the angle Y applies $Y=45°$.

13. A conveyor installation according to claim 1, wherein to the angle W applies $30°≤W≤120°$.

14. A conveyor installation according to claim 13, wherein to the angle W applies $W=40°$.

* * * * *